UNITED STATES PATENT OFFICE.

HENRY LOEWENBERG, OF NEW YORK, N. Y., ASSIGNOR TO HIMSELF AND EMILE GRANIER, OF PARIS, FRANCE.

IMPROVED COMPOSITION FOR LINING BARRELS FOR HOLDING PETROLEUM.

Specification forming part of Letters Patent No. 46,060, dated January 24, 1865; antedated December 10, 1864.

*To all whom it may concern:*

Be it known that I, HENRY LOEWENBERG, of the city, county, and State of New York, have invented a new and Improved Substitute for India-Rubber, &c.; and I do hereby declare that the following is a full, clear, and exact description of the same.

This invention consists in the use of a compound made of glue, acetic or pyroligneous acid, glycerine, and nut-gall, said ingredients being mixed together, as hereinafter described, so as to form a tough and elastic mass, which can be used with advantage as a substitute for india-rubber in making dolls' heads or other toys, and which may also be applied with advantage for covering cloth or for protecting or lining wooden or other articles to resist the penetration of oils, fats, or volatile matters, and also water.

The proportion in which I mix my ingredients together is variable, and depends upon the quality and nature of the materials used, though it must be remarked that the following proportion gives a good result: glue, four pounds; acetic acid, one-half pound; glycerine, four ounces; nut-gall, two ounces.

The acetic acid I dilute in about five parts of water and add it to the glue in such a quantity as to cover the same. When the glue is dissolved the other ingredients are added.

This composition is particularly applicable as a substitute for india-rubber. It is capable to resist the penetration of liquids, such as benzine, turpentine, oils, and fatty and volatile fluids. It is perfectly impervious to oils, and it can also be used with advantage as a varnish to wood-work, stones, or other articles to render the same proof against the influence of the liquids above named; or it may also be used as a lining for boxes or barrels, particularly for petroleum-barrels.

By the use of glue, acetic or pyroligneous acid, nut-gall, and glycerine the composition is rendered tough and prevented from becoming hard and brittle, and it is not liable to scale off and crack; nor is it soluble in water. It can be produced at a small expense, and its application to petroleum-barrels alone will cause an immense saving in oil which is now lost by leakage. It can also be used with advantage for printing-rollers.

Having thus fully described my invention, I would state that I lay no claim to a compound of glue and glycerine; but

What I do claim as new, and desire to secure by Letters Patent, is—

A substitute for india-rubber, or composition made of the ingredients herein specified, and mixed together in about the proportion and substantially in the manner set forth.

HENRY LOEWENBERG.

Witnesses:
WM. F. MCNAMARA,
M. M. LIVINGSTON.